(12) United States Patent
Bläse et al.

(10) Patent No.: US 6,958,120 B2
(45) Date of Patent: Oct. 25, 2005

(54) MEMBRANE MODULE

(75) Inventors: Dieter Bläse, Mutlangen (DE); Hans-Peter Feuerpeil, Schwäbisch Gmünd (DE)

(73) Assignee: Membraflow GmbH & Co. KG Filtersysteme, Aalen-Essingen (DE)

( * ) Notice: Subject to any disclaimer, the term of this patent is extended or adjusted under 35 U.S.C. 154(b) by 0 days.

(21) Appl. No.: 09/819,574

(22) Filed: Mar. 28, 2001

(65) Prior Publication Data

US 2001/0013272 A1 Aug. 16, 2001

(30) Foreign Application Priority Data

Oct. 7, 1998 (DE) .......................................... 198 46 041
Oct. 5, 1999 (NO) ................................. PCT/EP99/07356

(51) Int. Cl.[7] .............................................. B01D 63/06
(52) U.S. Cl. .............................. 210/323.2; 210/321.82; 210/446; 264/150; 264/162
(58) Field of Search ............................... 210/323.2, 446, 210/497.01, 500.1, 502, 503, 510.1, 321.82, 523; 228/120, 903, 128; 156/82; 29/458, 527.2, 527.5, 451; 264/150, 162

(56) References Cited

U.S. PATENT DOCUMENTS

| | | | |
|---|---|---|---|
| 4,473,471 A | 9/1984 | Robichaud et al. | 210/443 |
| 4,640,774 A | 2/1987 | Garcera et al. | 210/323.2 |
| 4,849,104 A | 7/1989 | Garcera et al. | 210/323.2 |
| 4,894,070 A * | 1/1990 | Keidel et al. | 55/96 |
| 5,037,461 A * | 8/1991 | Zievers | |
| 5,062,910 A | 11/1991 | Garcera et al. | 156/82 |
| 5,700,373 A * | 12/1997 | Ritland | |

FOREIGN PATENT DOCUMENTS

EP  0270051 B1  9/1991

* cited by examiner

Primary Examiner—W. L. Walker
Assistant Examiner—K S Menon
(74) Attorney, Agent, or Firm—Ohlandt, Greeley, Ruggiero & Perle, L.L.P.

(57) ABSTRACT

The invention relates to a method for producing a membrane module, comprising a plurality of bar-shaped ceramic filter elements disposed parallel to each other and stretched on the ends of the bay by covers, which extend perpendicular to said bars. Said modules also comprise sealing elements provided in-between the ends of the bars in addition to holes in the covers. The invention is characterized by the following features: initially, the individual sealing element is partially produced by finishing the inner hole thereof intended for surrounding the end of the bar to its final size while the outer surface of the sealing element remains unprocessed so that a sealing blank is formed; the sealing blank is then inserted into a support having outer dimensions in the insertion area corresponding to the mean outer dimensions of all filter elements or a plurality of filter elements. The outer surface of the sealing blank inserted into the support is processed to its set size thereby forming the finished sealing element. The finished sealing element is inserted into the end area of a filter element and assembled along with the other usual elements to form a finished membrane module.

11 Claims, 3 Drawing Sheets

MEMBRANE MODULE

FIELD OF THE INVENTION

The invention concerns a membrane module. Such modules are known. They serve for the process of separating a component from a liquid or a gas. They comprise a number of rod-shaped ceramic filter elements, which are arranged parallel to one another. Groups of such filter elements are assembled for the most part and are clamped at each end by means of covers. The covers thus run perpendicularly to the rods. The covers have a number of openings corresponding to the number of filter elements. The inside diameter of each opening is thus generally somewhat larger than the outer dimension of the terminal region of the individual rod. The intermediate space is filled by a sealing ring.

BACKGROUND OF THE INVENTION

Such a membrane module has become known, for example, from EP 0 270, 051.

The production of the individual filter element is associated, among other things, with an annealing process, which requires maximal temperatures. This can lead to a distortion of the material, so that the filter elements are no longer linear in shape, but—to exaggerate somewhat—assume a banana shape. Also, the final dimensions of the filter elements after the complete termination of the production process are not predictable. Deviations from the nominal size can occur. If a prefabricated gasket is attached onto the terminal region of a filter element, an excessive extension of the gasket, may occur, each time depending on the outer dimension of the filter element, in some cases, while in other cases, such attachment can lead to the circumstance that the gasket is no longer sufficiently tightly seated, or is seated with play in the terminal region. Both circumstances are associated with disadvantages. In the case of excessive elongation, this will lead sooner or later to a premature failure of the gasket, and in the case of an under-dimension, leakage can occur.

In order to avoid this disadvantage, it is proposed according to EP 0 270,051 A2 to process the sealing rings in a finished manner only on the inside, and then to attach the gasket onto the terminal region of the filter element and then to finish-processing it also on the outside.

Such a process has the following disadvantage:

After a longer operation, this leads to the fatigue of the seal material. The seals are then no longer capable of function and break down. It is thus necessary to change the seals sooner or later. The seals that are to be newly finished have the correct outer size, but they must again be attached onto the filter elements and must be processed on the outside in the attached state. For this purpose, the filter elements must be dismantled individually from the membrane module. This involves a considerable expense.

SUMMARY OF THE INVENTION

The object of the invention is to indicate a process, by which membrane modules can be produced in a cost-favorable manner, and, in fact, such that the seals perfectly fulfill their sealing function and have a service life that is as long as possible. Further, the replacement of damaged seals will be able to be conducted easily, rapidly and simply. Furthermore, a membrane module will be created by the invention, which perfectly fulfills its functions, which is particularly tight at the sealed sites, and which is simple in construction and cost-favorable in operation as well as with respect to maintenance. This object is resolved by the features of the independent claims.

Instead of the troublesome and expensive process according to the prior art, the inventors have followed another route:

They have observed that the individual sealing ring need not absolutely be attached onto an original filter element for the purpose of its finishing during its manufacture, and the outer dimensions of the seal will still satisfy the requirements. According to the invention, instead of this, a holder is used, which essentially has the outer contour of the filter elements in the terminal region, and whose outer dimensions in the terminal region corresponds identically to the average outer diameter of the terminal regions of all filter elements. Each individual seal is attached onto such a holder ("dummy") and is processed on its outer surface, so that the outer surface has the nominal dimensions after the processing. Then the finish-processed seal is attached onto a filter element. The filter elements, as stated above, have different dimensions in their terminal regions, and in fact, the individual seals have different outer dimensions from one filter element to another, which deviate from the ideal size. However, the inventors have recognized that this deviation is not important for the function of sealing. It lies within the tolerance range.

The process according to the invention has the very decisive advantage that the dummy can be used again also for the production of replacement seals, which will replace damaged seals, which spares a large expense.

The invention can be employed, whatever the cross-sectional configuration of the rod-shaped filler elements. The filter elements may have a circular, oval, hexagonal or polygonal cross-section.

The invention is also independent of whether the terminal region of the individual rod-shaped filter element has an over-dimension or under-dimension with respect to the main part. It is particularly favorable to provide the individual rod-shaped element in the terminal region with a smaller size when compared with the size of the main part. In this way, a shoulder is formed between the main part of the individual rod-shaped filter element and its terminal region, each time. These shoulders can be used for the purpose of taking up axial thrust, which acts on the filter elements during the operation of the membrane module.

BRIEF DESCRIPTION OF THE DRAWINGS

The invention is explained on the basis of the drawings. Taken individually.

DESCRIPTION OF THE PREFERRED EMBODIMENT

Figure 1:
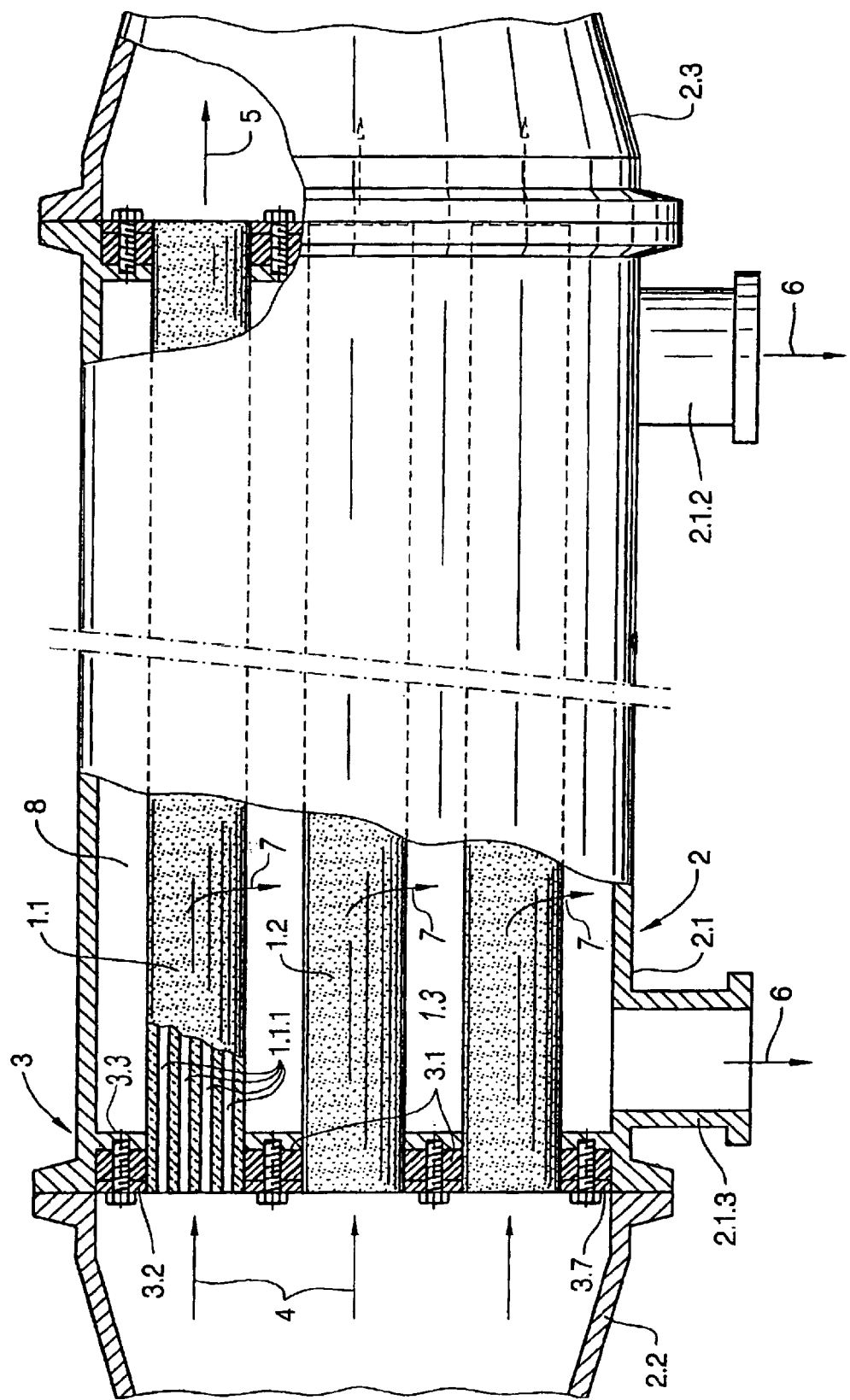
FIG. 1 shows a membrane module in a lateral view, with partially cutaway housing.

The membrane module shown in FIG. 1 comprises a number of filter elements 1.1, 1.2, 1.3. The filter elements are rod-shaped. They have a cylindrical configuration and a circular cross-section. A multiple number of channels 1.1.1 pass through each filter element.

The membrane module also comprises a housing 2, which encloses filter elements 1.1, 1.2, 1.3. Housing 2 is also circular-shaped. It has a main part 2.1 as well as conical connecting parts 2.2 and 2.3. Main part 2.1 has two discharge connections 2.1.2 and 2.1.3.

A cover unit 3, which is found each time at the ends of filter elements 1.1, 1.2 and 1.3, can also be discerned. Each cover unit 3 comprises a seal 3.1, an outer plate 3.2 and an inner plate 3.3. The inner plate 3.3 is made up in one part with main part 2.1 of housing 2 in this case. Components 3.1, 3.2 and 3.3 are joined together like a sandwich and are held together by screws.

Channels 1.1.1 of filter elements 1.1, 1.2, and 1.3 are loaded with the medium to be filtered—see arrow 4. Arrow 5 illustrates the discharge of the medium.

The so-called permeate—arrow 7—enters into space 8, which surrounds filter elements 1.1, 1.2, 1.3 and exits again from the main part 2.1 of housing 2 through the outlets 2.1.2, 2.1.3 at arrow 6.

As stated above, seal 3.1 in the present case is comprised of a plate with openings. The plate is produced according to the invention as follows:

First, a blank of plate 3.3 is produced, for example, by casting. The blank is then provided with the named openings. The plate is now attached onto rod-shaped holders (dummies). These dummies have outer diameters that correspond to an average diameter of all filter elements 1.1, 1.2 and 1.3, thus to a statistical mean value. The sealing plate 3.3 is processed on the outside, for example, by turning on a lathe. In this way, the nominal size is produced. Then sealing plate 3.3 is removed from the dummy and attached to a standard filter element. The outer dimension of sealing plate 3.3 is thus not changed at all or is changed only slightly, so that practically there is no deviation from the nominal outer size.

Figure 2:
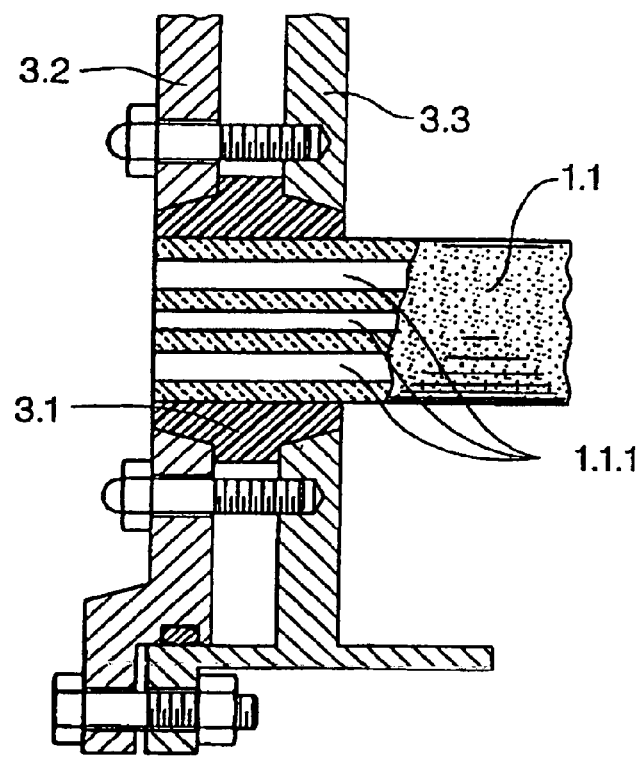
FIG. 2 shows an excerpt from a membrane module in the terminal region of a filter element.

A filter element 1.1 with a multiple number of channels 1.1.1 can be discerned in turn in FIG. 2. Filter element 1.1 is surrounded by a sealing ring or gasket 3.1. The gasket is clamped in two cover plates i.e., an outer cover plate 3.2 and an inner cover plate 3.3. The two cover plates are held together by screws.

In contrast to the form of embodiment according to FIG. 1, here, a plate-shaped seal, which is assigned to all filter elements in common is not present, but there is rather a multiple number of gaskets, such as gasket 3.1 that is shown.

In this form of embodiment, also, the process according to the invention was applied to the production and assembly of the seal.

Figure 3:
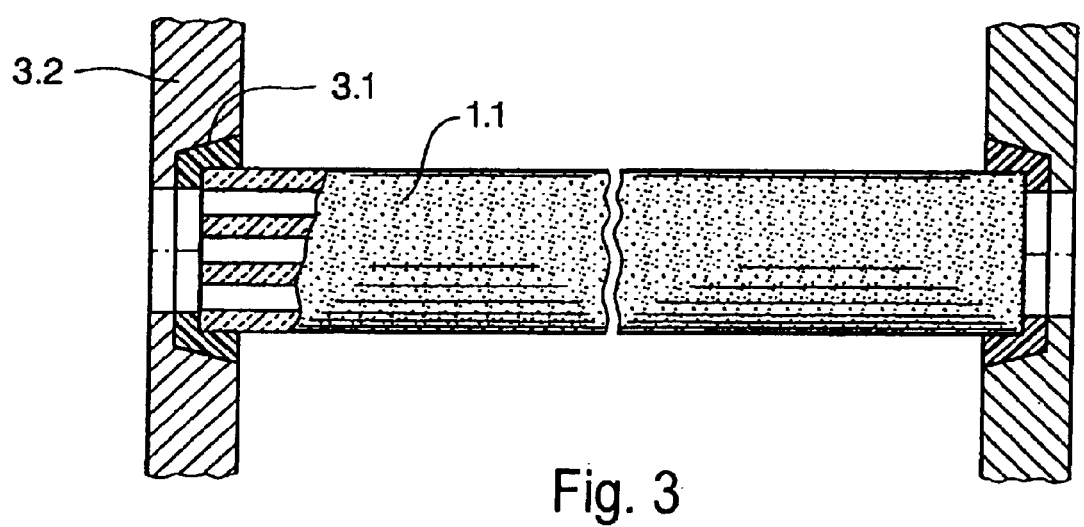
FIG. 3 shows an excerpt from another membrane module, again the terminal region of a filter element.

In the form of embodiment according to FIG. 3, the terminal region of the individual filter elements 3.1.1 is surrounded by a sealing ring or gasket 3.1. Gasket 3.1—as can be seen—is shaped like a pot and has a conical outer contour. Only a single cover plate 3.2 is provided.

Figure 4:
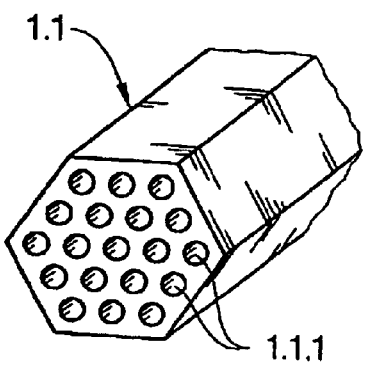
FIG. 4 shows the terminal region of a filter element in perspective presentation.

The filter element 1.1 shown in FIG. 4 has the cross-section of a regular hexagon. It could also have a round shape or other type of polygonal cross-section.

Figure 5:
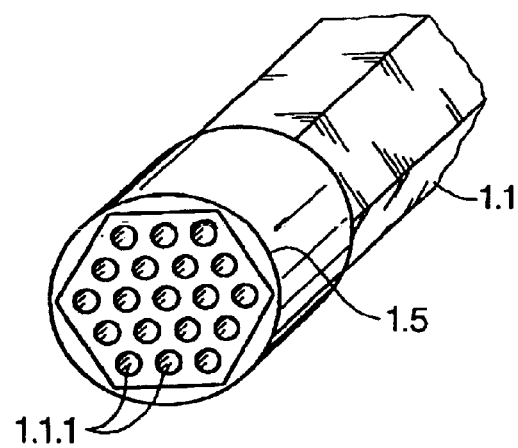
FIG. 5 shows the terminal region of another filter element, again in perspective presentation.

The filter element 1.1 shown in FIG. 5 is also of hexagonal cross-section. It is provided with a collar 1.5 in its terminal region. Collar 1.5 has a circular cross-section. It is specified to be surrounded by a seal, thus as is shown in FIGS. 1 to 3.

Figure 6:
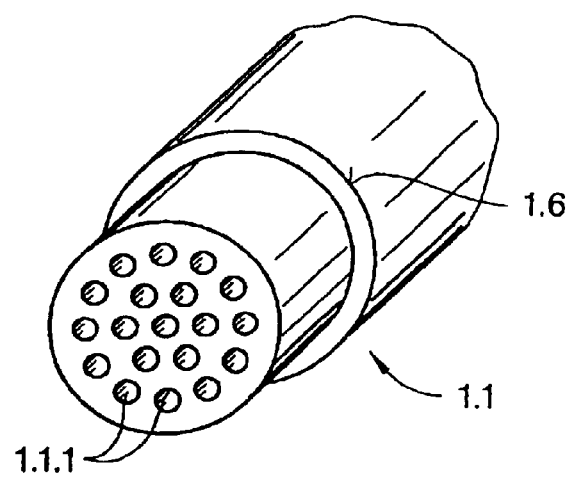
FIG. 6 shows a terminal region of another filter element in perspective presentation.

The filter element 1.1 shown in FIG. 6 has a smaller dimension in its terminal region in comparison with its main part, so that a collar 1.6 is present.

It is understood that the process according to the invention can be applied to all forms of embodiment, relative to producing and introducing the seal.

The inventors have further recognized the following:

The medium to be filtered also passes through the ceramic material in the terminal region. It thus reaches the seal from the channels of the filter element. Depending on the composition of the medium to be filtered, this may lead to a chemical attack on the sealing material and thus to a premature deterioration of the seal.

According to another concept of the invention, it may thus be appropriate to reinforce the terminal region of the individual filter element on the peripheral surface and, optionally, also on the front surface. For example, a foil which surrounds the named surfaces of the filter element and which provides for the fact that there is no contact between the material of the seal and the medium to be filtered, is considered.

What is claimed is:

1. A membrane module for filtering a medium to at least yield a permeate, comprising:

a plurality of ceramic filter elements being arranged parallel to one another, at least one of said plurality of ceramic filter elements having a main part and at least one terminal region, said at least one terminal region having a smaller diameter than said main part, said smaller diameter being defined without restricting flow of the medium through said terminal region, and wherein said at least one terminal region is reinforced at least on a peripheral edge of said at least one terminal region.

2. The membrane module of claim 1, wherein said at least one of said plurality of ceramic filter elements has a cross-sectional shape selected from the group consisting of circular, oval, hexagonal, and polygonal.

3. The membrane module of claim 1, further comprising:

a housing for enclosing said plurality of ceramic filter elements;

a cover being clamped to said at least one terminal region, said cover having a plurality of openings, said cover being perpendicular to said plurality of ceramic filter elements; and a finished seal being between said at least one terminal region and each of said plurality of openings in said cover.

4. The membrane module of claim 3, wherein said at least one terminal region is reinforced at least on a peripheral edge of said at least one terminal region so that the medium cannot come into contact with said finished seal.

5. The membrane module of claim 3, further comprising a permeate outlet connection arranged on said housing such that an inside space of said housing is completely emptied of the permeate when the membrane module is not in operation.

6. The membrane module of claim 3, wherein said cover has an inner plate and an outer plate, said finished seal being enclosed between said inner plate and said outer plate, a free space being provided radially outside a periphery of said finished seal between said inner plate and said outer plate, said finished seal being reinforced on said periphery such that extension of said finished seal into said free space when said inner plate and said outer plate are clamped together is hindered.

7. The membrane module of claim 3, wherein said finished seal abuts a shoulder defined by said main part and said at least one terminal region, said shoulder having the ability to take up an axial thrust force that acts upon said plurality of ceramic filter elements.

8. A ceramic filter element comprising:
- a first terminal region having a first outer dimension;
- a main part having a second outer dimension, said second outer dimension being larger than said first outer dimension;
- a foil reinforcing said first terminal region; and
- a plurality of flow channels passing through said main part and said first terminal region, each of said plurality of flow channels having a constant inner dimension.

9. The ceramic filter element of claim 8, further comprising a second terminal region having said first outer dimension.

10. The ceramic filter element of claim 8, further comprising a shoulder defined by said main part and said first terminal region, said shoulder having the ability to take up an axial thrust force that acts upon the ceramic filter element.

11. The ceramic filter element of claim 8, wherein said main part and said first terminal region each have a cross-sectional shape selected from the group consisting of circular, oval, hexagonal, polygonal, and any combinations thereof.

* * * * *